(12) United States Patent
Kim et al.

(10) Patent No.: US 12,436,439 B2
(45) Date of Patent: Oct. 7, 2025

(54) META-STRUCTURE

(71) Applicant: ELECTRONICS AND TELECOMMUNICATIONS RESEARCH INSTITUTE, Daejeon (KR)

(72) Inventors: Yong Hae Kim, Daejeon (KR); Chi-Sun Hwang, Daejeon (KR); Kyunghee Choi, Daejeon (KR); Joo Yeon Kim, Daejeon (KR); Jaehyun Moon, Daejeon (KR); Jong-Heon Yang, Daejeon (KR); Ji Hun Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 338 days.

(21) Appl. No.: 18/342,630

(22) Filed: Jun. 27, 2023

(65) Prior Publication Data
US 2024/0061306 A1    Feb. 22, 2024

(30) Foreign Application Priority Data
Aug. 19, 2022   (KR) .................. 10-2022-0104186

(51) Int. Cl.
*G02B 1/00*   (2006.01)
*G02F 1/19*   (2019.01)

(52) U.S. Cl.
CPC .................... *G02F 1/19* (2013.01)

(58) Field of Classification Search
CPC .................. G02F 1/19; G02B 1/002
See application file for complete search history.

(56) References Cited

U.S. PATENT DOCUMENTS

| | | |
|---|---|---|
| 6,747,779 B1 | 6/2004 | Morin et al. |
| 9,442,460 B2 | 9/2016 | Yoon et al. |
| 10,254,448 B2 | 4/2019 | Lee et al. |
| 10,670,941 B2 | 6/2020 | Park et al. |
| 11,048,142 B2 | 6/2021 | Jeong et al. |

(Continued)

FOREIGN PATENT DOCUMENTS

| | | |
|---|---|---|
| KR | 10-2001-0043668 A | 5/2001 |
| KR | 10-2007-0065551 A | 6/2007 |

(Continued)

OTHER PUBLICATIONS

Junghyun Park et al., "All-solid-state spatial light modulator with independent phase and amplitude control for three-dimensional LiDAR applications", Nature nanotechnology, Jan. 2021, p. 69-76, vol. 16.

(Continued)

*Primary Examiner* — Joseph P Martinez

(57) ABSTRACT

Disclosed is a meta-structure. The meta-structure includes a lower electrode, a lower insulating layer on the lower electrode, a lower metal oxide layer on the lower insulating layer, a lower metal layer on the lower metal oxide layer, a middle metal oxide layer on the lower metal layer, an upper metal layer on the middle metal oxide layer, an upper metal oxide layer on the upper metal layer, an upper insulating layer on the upper metal oxide layer, and antenna electrodes on the upper insulating layer.

20 Claims, 15 Drawing Sheets

(56) References Cited

U.S. PATENT DOCUMENTS

| | | |
|---|---|---|
| 2007/0138478 A1 | 6/2007 | Son et al. |
| 2011/0199273 A1 | 8/2011 | Kim et al. |
| 2012/0326944 A1 | 12/2012 | Choi et al. |
| 2019/0018299 A1* | 1/2019 | Park .................. G02F 1/292 |

FOREIGN PATENT DOCUMENTS

| | | |
|---|---|---|
| KR | 10-2017-0018765 A | 2/2017 |
| KR | 10-2017-0072647 A | 6/2017 |
| KR | 10-2019-0007755 A | 1/2019 |
| KR | 10-2020-0029924 A | 3/2020 |

OTHER PUBLICATIONS

Yong-Hae Kim et al. "Active metasurface using ITO device in visible wavelength", META 2022 Torremolinos-Spain, the 12th International Conference on Metamaterials, Photonic Crystals and Plasmonics, Jul. 2022.

* cited by examiner

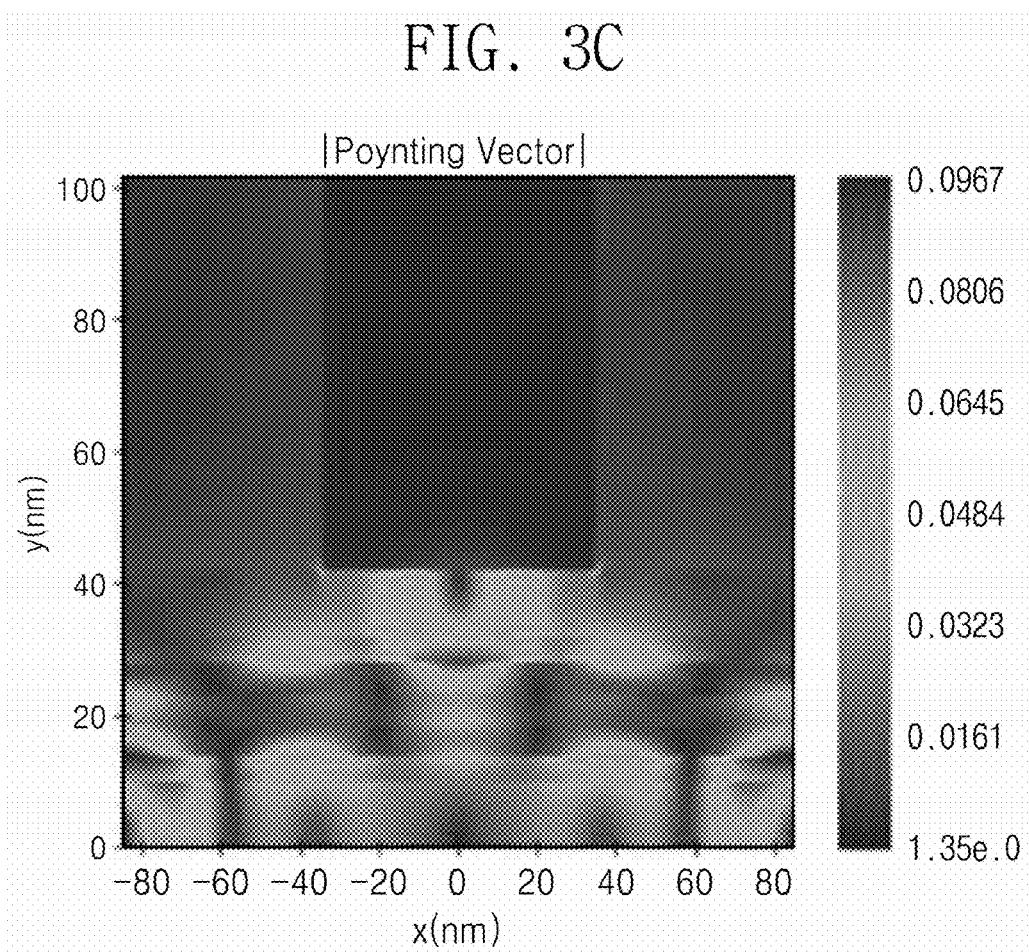

META-STRUCTURE

CROSS-REFERENCE TO RELATED APPLICATIONS

This U.S. non-provisional patent application claims priority under 35 U.S.C. § 119 of Korean Patent Application No. 10-2022-0104186, filed on Aug. 19, 2022, the entire contents of which are hereby incorporated by reference.

BACKGROUND

The present disclosure herein relates to a meta-structure, and more particularly, to a meta-structure having high complex modulation efficiency.

In general, few meta-structures perform active modulation at visible light wavelengths. Meta-structures operate in a near infrared region when using ITO electrodes, and operate in a mid-infrared region when using graphene electrodes. Recently, it has been reported that an epsilon near zero (ENZ) frequency at which effective permittivity becomes zero may be adjusted by stacking metals and dielectrics. When the metals and dielectrics are sufficiently thin, effective permittivity may be constant according to a mean field theory. When the metals and ITO follow a Drude model, an effective refractive index may reduce.

SUMMARY

The present disclosure provides a meta-structure capable of increasing complex light modulation efficiency.

An embodiment of the inventive concept provides a meta-structure including: a lower electrode; a lower insulating layer on the lower electrode; a lower metal oxide layer on the lower insulating layer; a lower metal layer on the lower metal oxide layer; a middle metal oxide layer on the lower metal layer; an upper metal layer on the middle metal oxide layer; an upper metal oxide layer on the upper metal layer; an upper insulating layer on the upper metal oxide layer; and antenna electrodes on the upper insulating layer.

In an embodiment, the middle metal oxide layer may have a thickness of 4 nm to 15 nm.

In an embodiment, the lower electrode and the antenna electrodes may include aluminum.

In an embodiment, the lower metal oxide layer, the middle metal oxide layer, and the upper metal oxide layer each may include indium tin oxide (ITO).

In an embodiment, the lower metal layer and the upper metal layer may include silver.

In an embodiment, the antenna electrodes may have a thickness of 50 nm, a pitch of 340 nm, and a width of 96 nm, the upper insulating layer may have a thickness of 10 nm, the upper metal oxide layer may have a thickness of 7 nm, the upper metal layer may have a thickness of 5 nm, the middle metal oxide layer may have a thickness of 10.5 nm, the lower metal layer may have a thickness of 5 nm, the lower metal oxide layer may have a thickness of 7 nm, the lower insulating layer may have a thickness of 10 nm, and the lower electrode may have a thickness of 100 nm.

In an embodiment, the antenna electrodes have a thickness of 50 nm, a pitch of 325 nm, and a width of 91.8 nm, the upper insulating layer may have a thickness of 10 nm, the upper metal oxide layer may have a thickness of 6 nm, the upper metal layer may have a thickness of 5 nm, the middle metal oxide layer may have a thickness of 10.5 nm, the lower metal layer may have a thickness of 5 nm, the lower metal oxide layer may have a thickness of 6 nm, the lower insulating layer may have a thickness of 10 nm, and the lower electrode may have a thickness of 100 nm.

In an embodiment, the antenna electrodes have a thickness of 50 nm, a pitch of 220 nm, and a width of 93.2 nm, the upper insulating layer may have a thickness of 10 nm, the upper metal oxide layer may have a thickness of 8 nm, the upper metal layer may have a thickness of 5 nm, the middle metal oxide layer may have a thickness of 6.6 nm, the lower metal layer may have a thickness of 5 nm, the lower metal oxide layer may have a thickness of 8 nm, the lower insulating layer may have a thickness of 10 nm, and the lower electrode may have a thickness of 100 nm.

In an embodiment, the antenna electrodes have a thickness of 50 nm, a pitch of 30.5 nm, and a width of 86 nm, the upper insulating layer may have a thickness of 10 nm, the upper metal oxide layer may have a thickness of 4 nm, the upper metal layer may have a thickness of 5 nm, the middle metal oxide layer may have a thickness of 7.7 nm, the lower metal layer may have a thickness of 5 nm, the lower metal oxide layer may have a thickness of 4 nm, the lower insulating layer may have a thickness of 10 nm, and the lower electrode may have a thickness of 100 nm.

In an embodiment, the antenna electrodes have a thickness of 50 nm, a pitch of 20 nm, and a width of 84.7 nm, the upper insulating layer may have a thickness of 9 nm, the upper metal oxide layer may have a thickness of 5 nm, the upper metal layer may have a thickness of 5 nm, the middle metal oxide layer may have a thickness of 9.3 nm, the lower metal layer may have a thickness of 5 nm, the lower metal oxide layer may have a thickness of 5 nm, the lower insulating layer may have a thickness of 9 nm, and the lower electrode may have a thickness of 100 nm.

In an embodiment, the antenna electrodes have a thickness of 50 nm, a pitch of 340 nm, and a width of 96 nm, the upper insulating layer may have a thickness of 10 nm, the upper metal oxide layer may have a thickness of 10 nm, the upper metal layer may have a thickness of 5 nm, the middle metal oxide layer may have a thickness of 6.3 nm, the lower metal layer may have a thickness of 5 nm, the lower metal oxide layer may have a thickness of 10 nm, the lower insulating layer may have a thickness of 10 nm, and the lower electrode may have a thickness of 100 nm.

In an embodiment, the antenna electrodes have a thickness of 50 nm, a pitch of 240 nm, and a width of 67.8 nm, the upper insulating layer may have a thickness of 10 nm, the upper metal oxide layer may have a thickness of 5 nm, the upper metal layer may have a thickness of 6 nm, the middle metal oxide layer may have a thickness of 9 nm, the lower metal layer may have a thickness of 6 nm, the lower metal oxide layer may have a thickness of 5 nm, the lower insulating layer may have a thickness of 10 nm, and the lower electrode may have a thickness of 100 nm.

In an embodiment, the antenna electrodes have a thickness of 50 nm, a pitch of 158 nm, and a width of 66.9 nm, the upper insulating layer may have a thickness of 10 nm, the upper metal oxide layer may have a thickness of 5 nm, the upper metal layer may have a thickness of 5.5 nm, the middle metal oxide layer may have a thickness of 4 nm, the lower metal layer may have a thickness of 5.5 nm, the lower metal oxide layer may have a thickness of 5 nm, the lower insulating layer may have a thickness of 10 nm, and the lower electrode may have a thickness of 100 nm.

In an embodiment, the antenna electrodes have a thickness of 50 nm, a pitch of 235 nm, and a width of 66.4 nm, the upper insulating layer may have a thickness of 10 nm, the upper metal oxide layer may have a thickness of 5 nm, the upper metal layer may have a thickness of 5.5 nm, the middle metal oxide layer may have a thickness of 5.2 nm, the lower metal layer may have a thickness of 5.5 nm, the lower metal oxide layer may have a thickness of 5 nm, the lower insulating layer may have a thickness of 10 nm, and the lower electrode may have a thickness of 100 nm.

In an embodiment, the antenna electrodes have a thickness of 50 nm, a pitch of 230 nm, and a width of 65 nm, the upper insulating layer may have a thickness of 10 nm, the upper metal oxide layer may have a thickness of 5 nm, the upper metal layer may have a thickness of 5.5 nm, the middle metal oxide layer may have a thickness of 4 nm, the lower metal layer may have a thickness of 5.5 nm, the lower metal oxide layer may have a thickness of 5 nm, the lower insulating layer may have a thickness of 10 nm, and the lower electrode may have a thickness of 100 nm.

In an embodiment, the antenna electrodes have a thickness of 50 nm, a pitch of 122 nm, and a width of 51 nm, the upper insulating layer may have a thickness of 10 nm, the upper metal oxide layer may have a thickness of 4 nm, the upper metal layer may have a thickness of 5 nm, the middle metal oxide layer may have a thickness of 15 nm, the lower metal layer may have a thickness of 5 nm, the lower metal oxide layer may have a thickness of 4 nm, the lower insulating layer may have a thickness of 10 nm, and the lower electrode may have a thickness of 100 nm.

In an embodiment, the antenna electrodes have a thickness of 50 nm, a pitch of 200 nm, and a width of 56.5 nm, the upper insulating layer may have a thickness of 10 nm, the upper metal oxide layer may have a thickness of 7 nm, the upper metal layer may have a thickness of 5 nm, the middle metal oxide layer may have a thickness of 13.2 nm, the lower metal layer may have a thickness of 5 nm, the lower metal oxide layer may have a thickness of 7 nm, the lower insulating layer may have a thickness of 10 nm, and the lower electrode may have a thickness of 100 nm.

In an embodiment, the antenna electrodes have a thickness of 50 nm, a pitch of 205 nm, and a width of 57.9 nm, the upper insulating layer may have a thickness of 10 nm, the upper metal oxide layer may have a thickness of 10 nm, the upper metal layer may have a thickness of 5 nm, the middle metal oxide layer may have a thickness of 10 nm, the lower metal layer may have a thickness of 5 nm, the lower metal oxide layer may have a thickness of 10 nm, the lower insulating layer may have a thickness of 10 nm, and the lower electrode may have a thickness of 100 nm.

In an embodiment, the antenna electrodes have a thickness of 50 nm, a pitch of 190 nm, and a width of 53.7 nm, the upper insulating layer may have a thickness of 10 nm, the upper metal oxide layer may have a thickness of 6 nm, the upper metal layer may have a thickness of 5 nm, the middle metal oxide layer may have a thickness of 12 nm, the lower metal layer may have a thickness of 5 nm, the lower metal oxide layer may have a thickness of 6 nm, the lower insulating layer may have a thickness of 10 nm, and the lower electrode may have a thickness of 100 nm.

In an embodiment, the antenna electrodes have a thickness of 50 nm, a pitch of 135 nm, and a width of 57.2 nm, the upper insulating layer may have a thickness of 10 nm, the upper metal oxide layer may have a thickness of 8 nm, the upper metal layer may have a thickness of 5 nm, the middle metal oxide layer may have a thickness of 11 nm, the lower metal layer may have a thickness of 5 nm, the lower metal oxide layer may have a thickness of 8 nm, the lower insulating layer may have a thickness of 10 nm, and the lower electrode may have a thickness of 100 nm.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIG. 3A, FIG. 3B and FIG. 3C are diagrams illustrating intensities of an electric field, magnetic field, and Poynting vector at a maximum efficiency condition of complex modulation;

DETAILED DESCRIPTION

Figure 1:
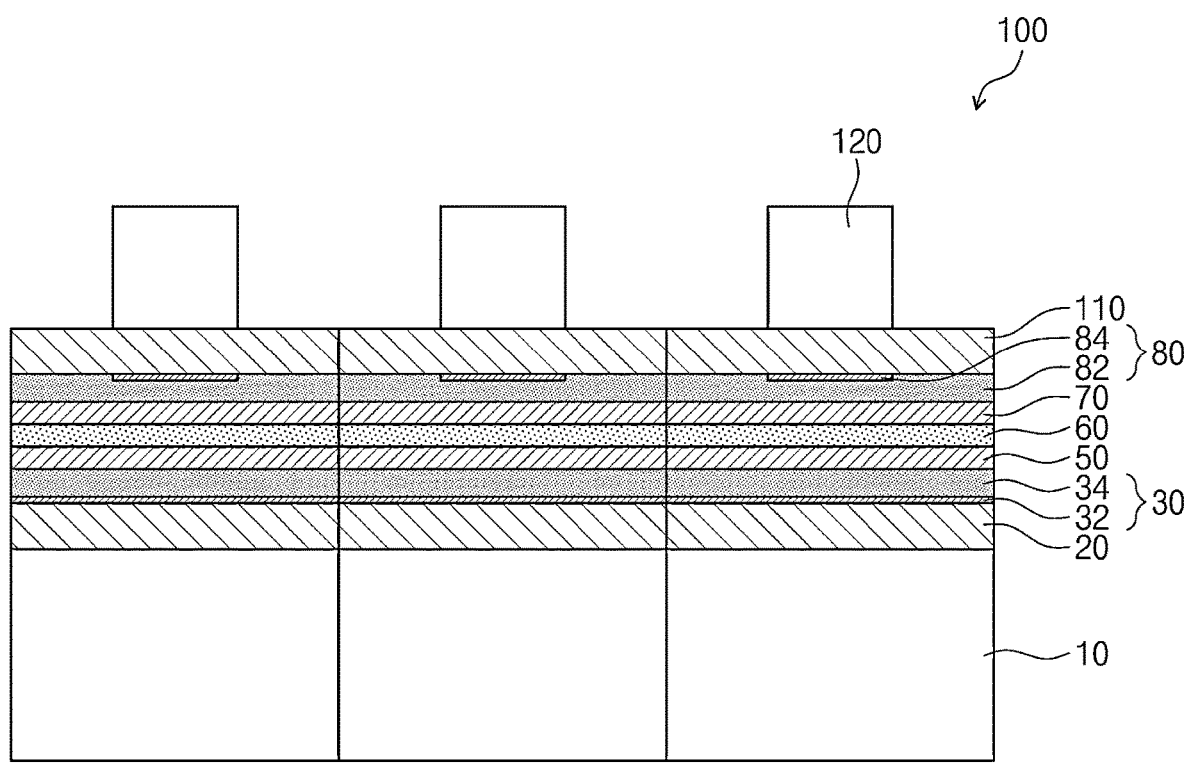
FIG. 1 is a cross-sectional view of an example of a meta-structure according to the inventive concept.

Embodiments of the inventive concept will now be described in detail with reference to the accompanying drawings. Advantages and features of embodiments of the inventive concept, and implementation methods thereof will be clarified through following embodiments described with reference to the accompanying drawings. However, the inventive concept may be embodied in different forms and should not be construed as limited to the embodiments set forth herein. Rather, these embodiments are provided so that this disclosure will be thorough and complete, and will fully convey the scope of the present invention to those skilled in the art, and the present invention is only defined by the scope of the claims. Like reference numerals refer to like elements throughout.

The terminology used herein is not for delimiting the embodiments of the inventive concept but for describing the embodiments. The terms of a singular form may include plural forms unless otherwise specified. It will be further understood that the terms "includes", "including", "comprises", and/or "comprising", when used in this description, specify the presence of stated elements, operations, and/or components, but do not preclude the presence or addition of one or more other elements, operations, and/or components. Furthermore, reference numerals, which are presented in the order of description, are provided according to the embodiments and are thus not necessarily limited to the order.

The embodiments of the inventive concept will be described with reference to example cross-sectional views and/or plan views. In the drawings, the dimensions of layers and regions are exaggerated for clarity of illustration. Therefore, the forms of the example drawings may be changed due to a manufacturing technology and/or error tolerance. Therefore, the embodiments of the inventive concept may involve changes of shapes depending on a manufacturing process, without being limited to the illustrated specific forms.

FIG. 1 illustrates an example of a meta-structure 100 according to the inventive concept.

Referring to FIG. 1, the meta-structure 100 of the inventive concept may be a meta-structure that actively modulates at visible light wavelengths. According to an example, the meta-structure 100 of the inventive concept may include a lower electrode 10, a lower insulating layer 20, a lower metal oxide layer 30, a lower metal layer 50, a middle metal oxide layer 60, an upper metal layer 70, an upper metal oxide layer 80, an upper insulating layer 110, and antenna electrodes 120.

The lower electrode 10 may be provided below the lower insulating layer 20. The lower electrode 10 may include a transparent electrode. For example, the lower electrode 10 may include aluminum (Al). Alternatively, the lower electrode 10 may include gold (Au), silver (Ag), copper (Cu), aluminum (Al), tungsten (W), or ITO (indium tin oxide), but an embodiment of the inventive concept is not limited thereto. The lower electrode 10 may have a thickness of about 100 nm or more.

The lower insulating layer 20 may be provided on the lower electrode 10. The lower insulating layer 20 may include a dielectric. For example, the lower insulating layer 20 may include Al2O3. Alternatively, the lower insulating layer 20 may include a silicon oxide or silicon nitride, but an embodiment of the inventive concept is not limited thereto. The lower insulating layer 20 may have a thickness of about 5 nm to about 15 nm.

The lower metal oxide layer 30 may be provided on the lower insulating layer 20. The lower metal oxide layer 30 may include a transparent layer. The lower metal oxide layer 30 may include ITO. According to an example, the lower metal oxide layer 30 may include a first lower metal oxide layer 32 and a second lower metal oxide layer 34. The first lower metal oxide layer 32 may have a thickness of about 4 nm to about 10 nm. The second lower metal oxide layer 34 may be provided on the first lower metal oxide layer 32. The second lower metal oxide layer 34 may have oxide concentration different from that of the first lower metal oxide layer 32. The second lower metal oxide layer 34 may have a thickness of about 4 nm to about 10 nm.

The lower metal layer 50 may be provided on the second lower metal oxide layer 34. The lower metal layer 50 may be a transflective layer. The lower metal layer 50 may include silver (Ag).

The middle metal oxide layer 60 may be provided on the lower metal layer 50. The middle metal oxide layer 60 may include a transparent layer. The middle metal oxide layer 60 may have a thickness of about 4 nm to about 15 nm.

The upper metal layer 70 may be provided on the middle metal oxide layer 60. The upper metal layer 70 may be a transflective layer. The upper metal layer 70 may include silver (Ag).

The upper metal oxide layer 80 may be provided on the upper metal layer 70. The upper metal oxide layer 80 may include a transparent layer. The upper metal oxide layer 80 may include ITO. According to an example, the upper metal oxide layer 80 may include a first upper metal oxide layer 82 and a second upper metal oxide layer 84. The first upper metal oxide layer 82 may have a thickness of about 4 nm to about 10 nm. The second upper metal oxide layer 84 may be provided on the first upper metal oxide layer 82. The second upper metal oxide layer 84 may have oxide concentration different from that of the first upper metal oxide layer 82. The second upper metal oxide layer 84 may have a thickness of about 4 nm to about 10 nm.

The upper insulating layer 110 may be provided on the second upper metal oxide layer 84. The upper insulating layer 110 may be the same as the lower insulating layer 20. The upper insulating layer 110 may include a dielectric. For example, the upper insulating layer 110 may include Al2O3. Alternatively, the upper insulating layer 110 may include a silicon oxide or silicon nitride, but an embodiment of the inventive concept is not limited thereto.

The antenna electrodes 120 may be provided on the upper insulating layer 110. The antenna electrodes 120 may have a smaller area size than the lower electrode 10. The antenna electrodes 120 may include aluminum (Al). The antenna electrodes 120 may have a thickness of about 60 nm. The antenna electrodes 120 may be spaced at a pitch of about 122 nm to about 340 nm.

Therefore, the meta-structure 100 of the inventive concept may increase complex light modulation efficiency using the upper metal oxide layer 80, the middle metal oxide layer 60, and the lower metal oxide layer 30 stacked between the upper metal layer 70 and the lower metal layer 50.

Meanwhile, the antenna electrodes 120 may have a characteristic of adjusting a resonance wavelength of light. The lower electrode 10 may function as a light reflective plate.

Figure 2:
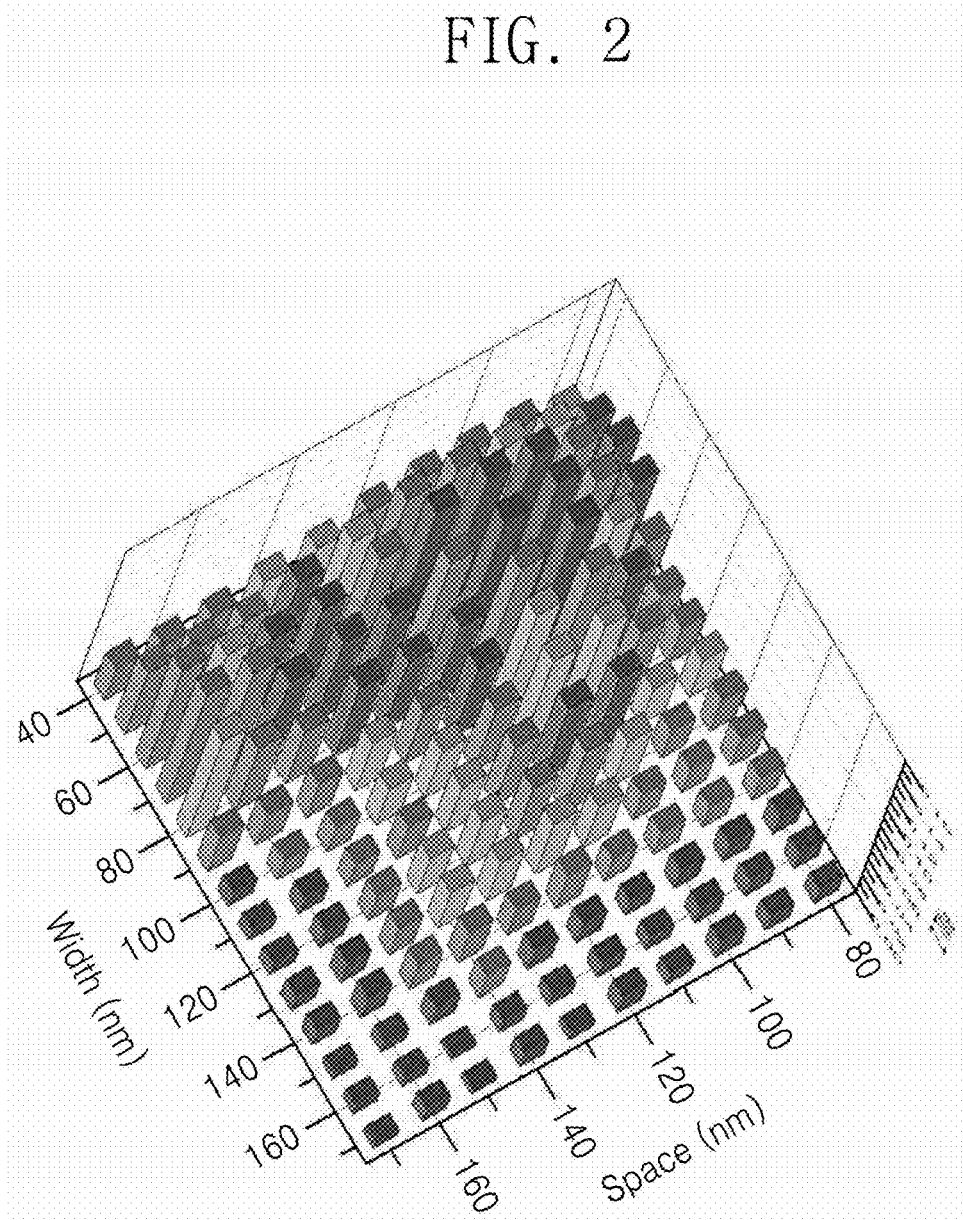
FIG. 2 is a diagram illustrating a complex area of reflectance that changes according to a width and space of the antenna electrodes of FIG. 1.

FIG. 2 shows a complex area of reflectance that changes according to a width and space of the antenna electrodes 120 of FIG. 1.

Referring to FIG. 2, the complex area of the antenna electrodes 120 may be inversely proportional to the width and space of the antenna electrodes 120. When the antenna electrodes 120 have a width of about 70 nm and a space of about 100 nm, the complex area may reach a peak. Although not illustrated, the complex area may reach a peak at a space of about 170 nm or more. Therefore, maximum modulation efficiency may be determined by the width and space of the antenna electrodes 120. Furthermore, the maximum modulation efficiency may be determined by a thickness of the middle metal oxide layer 60.

Figure 3A:
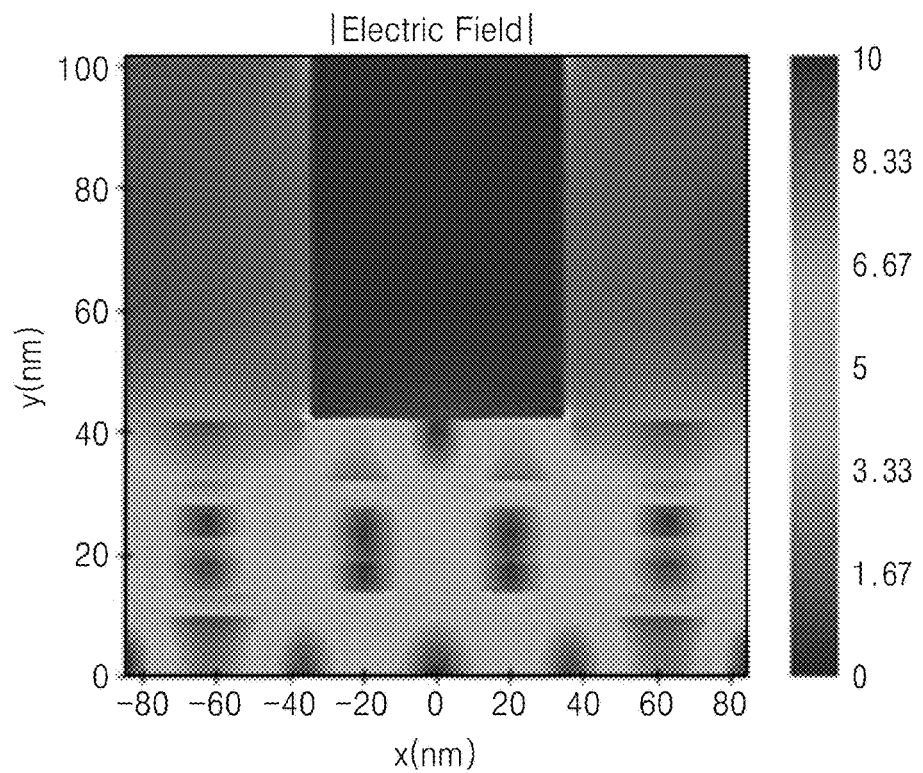
Figure 3B:
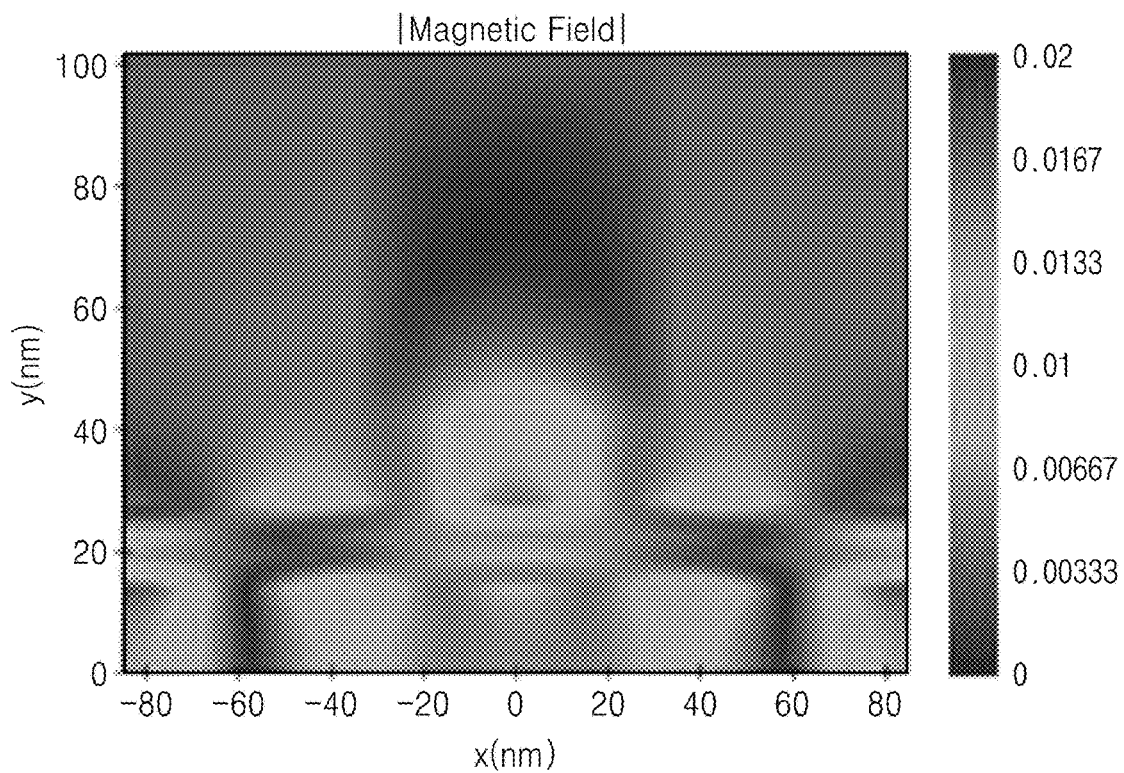

FIGS. 3A to 3C shows intensities of an electric field, magnetic field, and Poynting vector at a maximum efficiency condition of complex modulation.

Referring to FIGS. 3A to 3C, characteristics of the electric field and magnetic field may have four nodes. A characteristic of the Poynting vector may have surface plasma polariton (SPP). The SPP may be strongly exhibited between the lower and upper metal oxide layers 30 and 80 and the lower and upper metal layers 50 and 70. Furthermore, gap SPP may be generated between the lower and upper metal oxide layers 30 and 80 and the lower and upper insulating layers 20 and 110.

Therefore, the meta-structure 100 of the inventive concept may have a strong SPP mode generated between a metal oxide layer and a metal layer and a gap SPP mode between the lower electrode 10 and the antenna electrodes 120.

A relationship between the width and pitch of the antenna electrodes 120 and the thickness of the middle metal oxide layer 60 is described as below.

First, resonance may be started by the gap SPP mode, and a resonance wavelength and pitch may be determined. The gap SPP mode may be a mode excited by the antenna electrodes 120, the upper insulating layer 110, the upper metal oxide layer 80, and the upper metal layer 70. A wavelength of the gap SPP mode may be dependent on various variables.

Figure 4A:
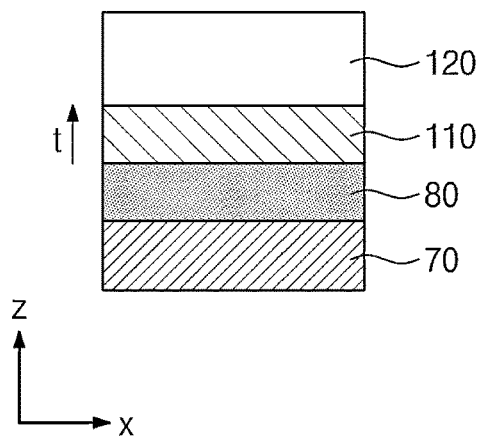
FIG. 4A is a cross-sectional view illustrating an example of the antenna electrodes, the upper insulating layer, the upper metal oxide layer, and the upper metal layer of FIG. 1.
Figure 4B:
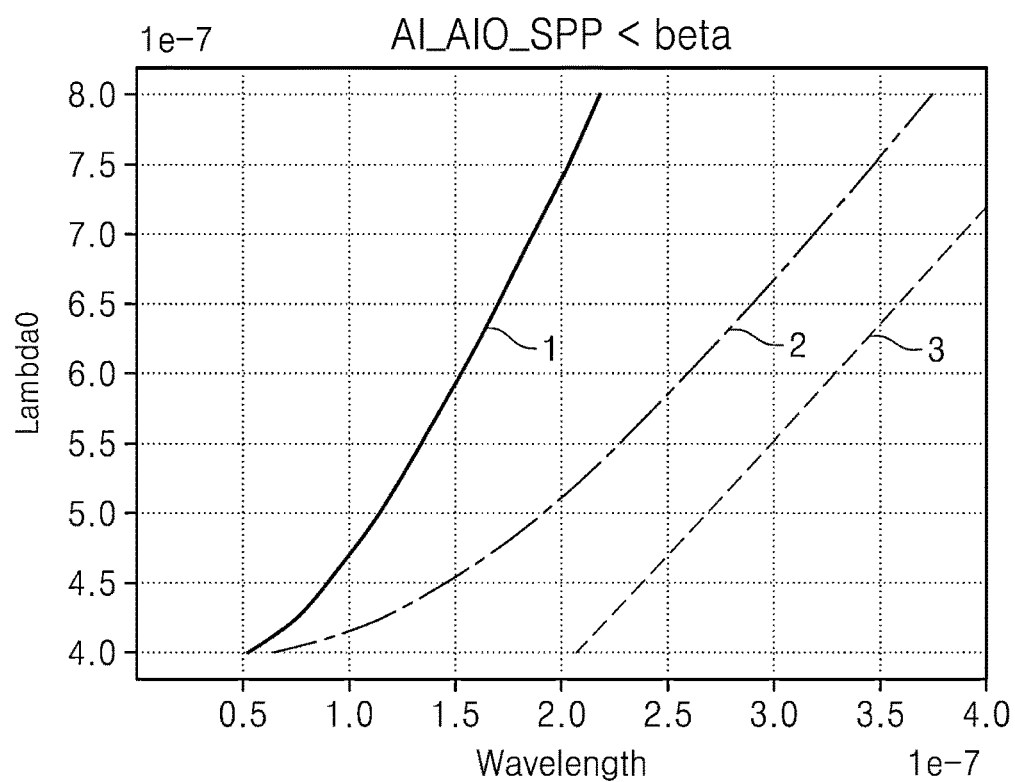
FIG. 4B illustrates graphs showing an example of a dispersion characteristic of gap SPP.

FIG. 4A illustrates an example of the antenna electrodes 120, the upper insulating layer 110, the upper metal oxide layer 80, and the upper metal layer 70 of FIG. 1. FIG. 4B illustrates an example of a dispersion characteristic of the gap SPP.

Referring to FIGS. 4A and 4B, the antenna electrodes 120, the upper insulating layer 110, the upper metal oxide layer 80, and the upper metal layer 70 may generate a first SPP 1, a second SPP 2, and a third SPP 3. The first SPP 1 may appear in the antenna electrodes 120, the upper insulating layer 110, the upper metal oxide layer 80, and the upper metal layer 70. The second SPP 2 may appear in the upper metal layer 70 and the upper metal oxide layer 80. The third SPP 3 may appear in the upper insulating layer 110 and the antenna electrodes 120. The antenna electrodes 120 may have the same width as the upper insulating layer 110. A resonance wavelength of such an ideal gap SPP may be expressed as Equation 1.

$$\lambda_{gSPP\_ideal} = \frac{2\pi w}{\pi - \varphi}. \quad \text{[Equation 1]}$$

Where $\lambda_{gSPP\_ideal}$ may denote the resonance wavelength of gap SPP, w may denote the width of the antenna electrodes 120, and Φ may denote a phase of light. An ideal gap SPP may be proportional to the width w of the antenna electrodes 120 and inversely proportional to the phase Φ.

Figure 5:
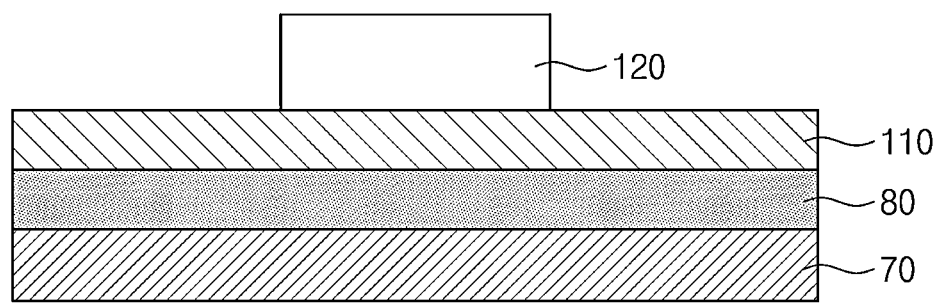
FIG. 5 is a cross-sectional view illustrating an example of the antenna electrodes, the upper insulating layer, the first and second upper metal oxide layers, and the upper metal layer of FIG. 1.

FIG. 5 illustrates an example of the antenna electrodes 120, the upper insulating layer 110, the first and second upper metal oxide layers 80 and 90, and the upper metal layer 70 of FIG. 1.

Referring to FIG. 5, the antenna electrodes 120 may have a smaller width than that of the upper insulating layer 110. An actual gap SPP may have a lower resonance wavelength than that of an ideal gap SPP.

$$\lambda_{gSPP\_ideal} = \frac{2\pi w}{\pi - \varphi} \frac{1}{1.14} = k2w \quad \text{[Equation 2]}$$

Where $\lambda_{gSPP\_real}$ may denote the resonance wavelength of actual gap SPP, w may denote the width of the antenna electrodes 120, Φ may denote a phase of light, and k may be a constant obtained through FDTD simulation. k may be about 1.18. A first pitch of the antenna electrodes 120 may be 1 times, 1.5 times, 2 times, or 2.5 times the resonance wavelength of a gap SPP. The width w of the antenna electrodes 120 may be obtained by dividing the resonance wavelength of a gap SPP by 2 k.

Next, a mixed mode in which resonance may occur within a pitch determined by a gap SPP may be activated in the structure. Here, two mixed modes may be generated. When two mixed modes are activated, complex modulation efficiency may increase.

Figure 6:
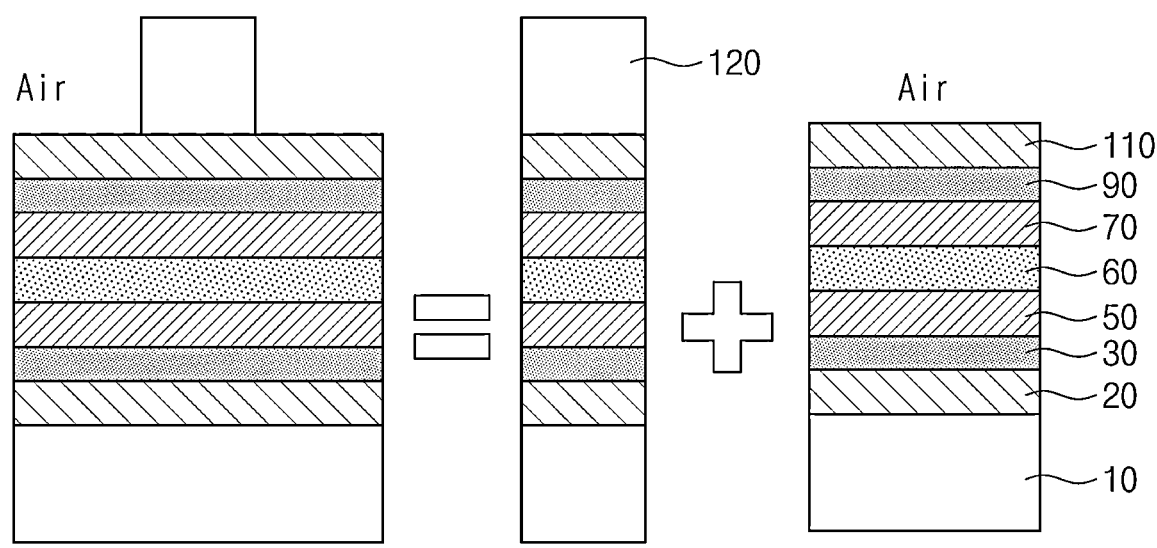
FIG. 6 is a cross-sectional view illustrating an example of the lower electrode, the lower insulating layer, the lower metal oxide layer, the lower metal layer, the middle metal oxide layer, the upper metal layer, the upper metal oxide layer, the upper insulating layer, and the antenna electrodes of FIG. 1.

FIG. 6 illustrates an example of the lower electrode 10, the lower insulating layer 20, the lower metal oxide layer 30, the lower metal layer 50, the middle metal oxide layer 60, the upper metal layer 70, the upper metal oxide layer 80, the upper insulating layer 110, and the antenna electrodes 120 of FIG. 1.

Referring to FIG. 6, the lower electrode 10, the lower insulating layer 20, the lower metal oxide layer 30, the lower metal layer 50, the middle metal oxide layer 60, the upper metal layer 70, the upper metal oxide layer 80, the upper insulating layer 110, and the antenna electrodes 120 may generate a mixed SPP mode. The mixed SPP mode may be calculated as a sum of an ideal mixed SPP mode and a bare mixed SPP mode. The ideal mixed SPP mode may appear among the lower electrode 10 to the antenna electrodes 120. The bear mixed SPP mode may appear among the lower electrode 10 to the upper insulating layer 110.

Figure 7:
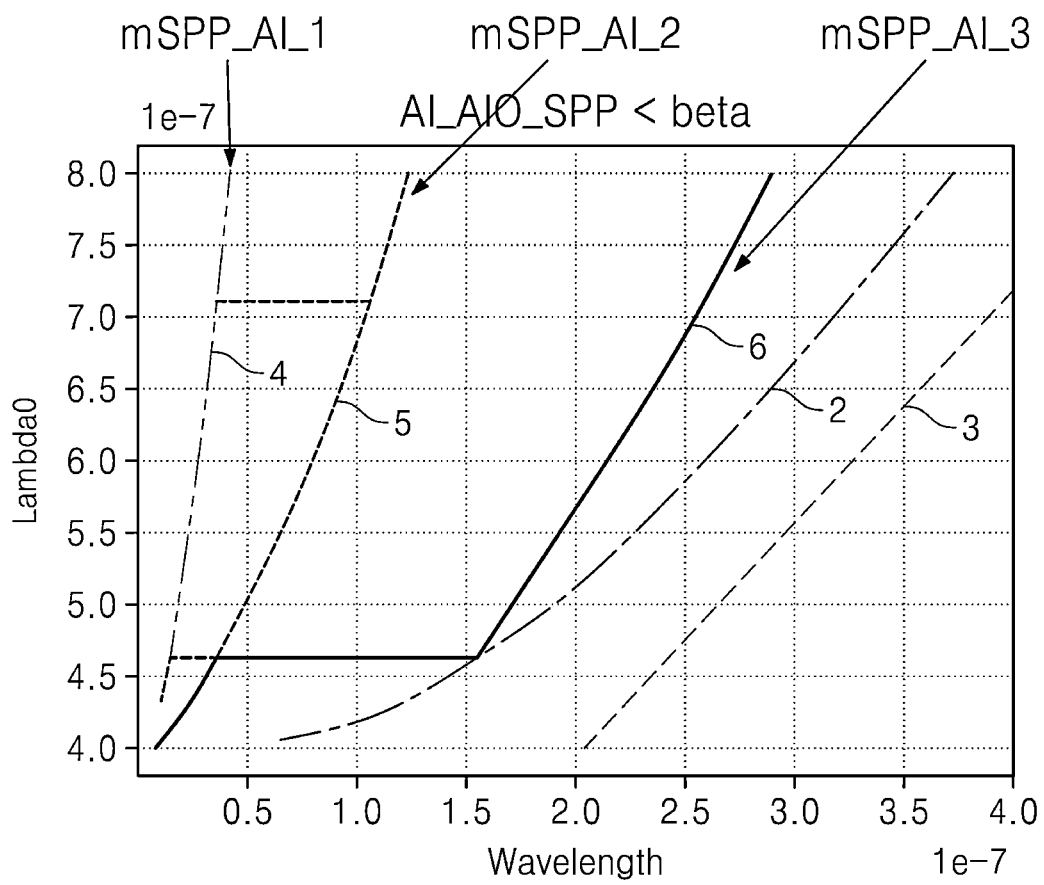
FIG. 7 illustrates graphs showing an example of a dispersion curve of an ideal mixed SPP exhibited due to the lower electrode to the antenna electrodes of FIG. 6.

FIG. 7 illustrates an example of a dispersion curve of an ideal mixed SPP exhibited due to the lower electrode 10 to the antenna electrodes 120 of FIG. 6.

Referring to FIG. 7, the ideal mixed SPP mode may further include an mSPP_Al_1 mode 4, mSPP_Al_2 mode 5, and mSpp_Al_3 mode 6. The mSPP_Al_1 mode 4 may be generated by the lower metal oxide layer 30, the lower metal layer 50, the middle metal oxide layer 60, the upper metal layer 70, and the upper metal oxide layer 80. The mSPP_Al_1 mode 4 may be inversely proportional to the thickness of the middle metal oxide layer 60 and inversely proportional to the thickness of each of the upper metal oxide layer 80 and the lower metal oxide layer 30. The mSPP_Al_2 mode 5 and the mSpp_Al_3 mode 6 may be similar to the mSPP_Al_1 mode 4.

Figure 8:
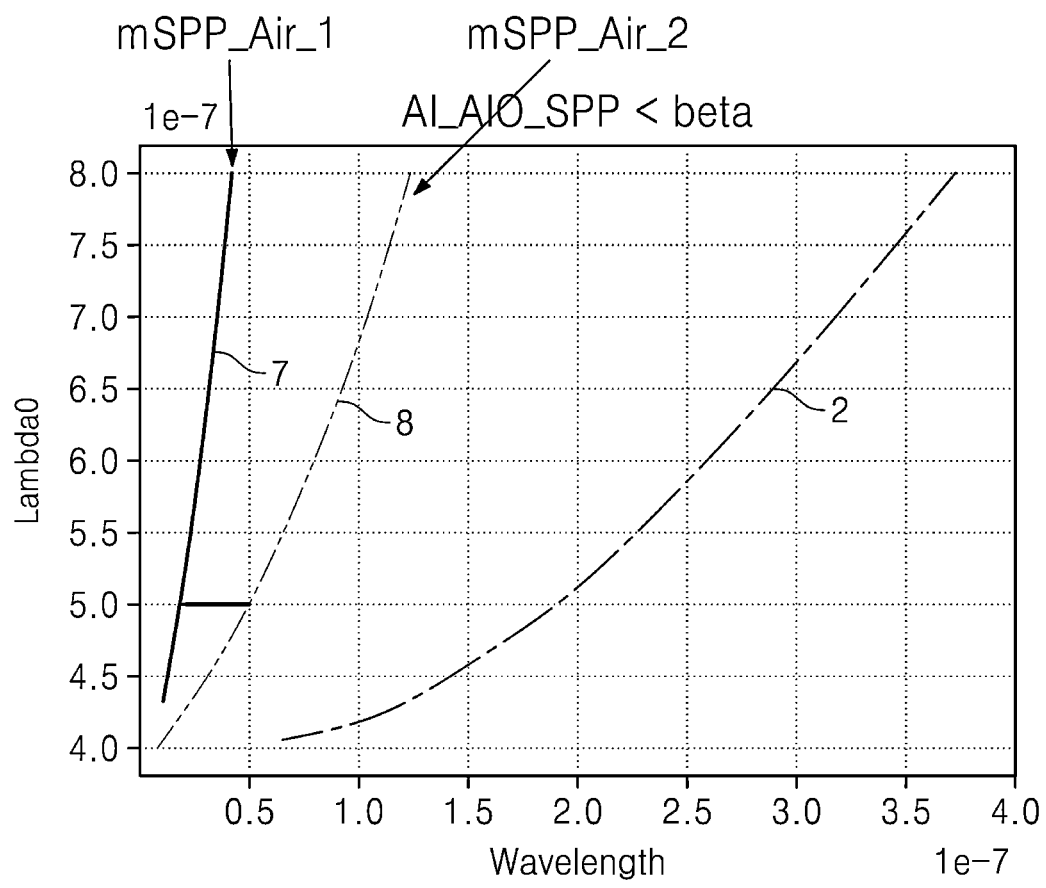
FIG. 8 illustrates graphs showing an example of a dispersion curve of a bare mixed SPP among the lower electrode to the upper insulating layer of FIG. 6.

FIG. 8 illustrates an example of a dispersion curve of a bare mixed SPP among the lower electrode 10 to the upper insulating layer 110 of FIG. 6.

Referring to FIG. 8, the bare mixed SPP mode may further include an mSPP_air_1 mode 7 and mSPP_air_2 mode 8. The mSPP_air_1 mode 7 may be the same as the mSPP_Al_1 mode 4 of FIG. 7. For example, the mSPP_air_1 mode 7 may be generated by the lower metal oxide layer 30, the lower metal layer 50, the middle metal oxide layer 60, the upper metal layer 70, and the upper metal oxide layer 80. The mSPP_air_2 mode 8 may be similar to the mSPP_Al_2 mode 5 of FIG. 7.

Meanwhile, in order to activate the mixed SPP mode, a first pitch determined by a gap SPP may be required to match a second pitch determined by the resonance wavelength of a mixed SPP1. That is, the second pitch may be calculated by multiplying the resonance wavelength of the mSPP_Al_1 mode 4 by a natural number.

Furthermore, in order to activate the mixed SPP mode, a third pitch determined by the resonance wavelength of a mixed SPP2 may be required to match. However, since the mSPP_Al_2 mode 5 and the mSPP_air_2 mode 8 have a slight difference, it may be required to add a weighted average of areas occupied by the antenna electrodes 120 for all of third pitches. That is, pitch 3 may be calculated as a sum of a value obtained by multiplying the resonance wavelength of the mSPP_air_2 mode 8 by natural number 2_air and a value obtained by multiplying the resonance wavelength of the mSPP_Al_2 mode 5 by natural number 2_A10.

Figure 9:
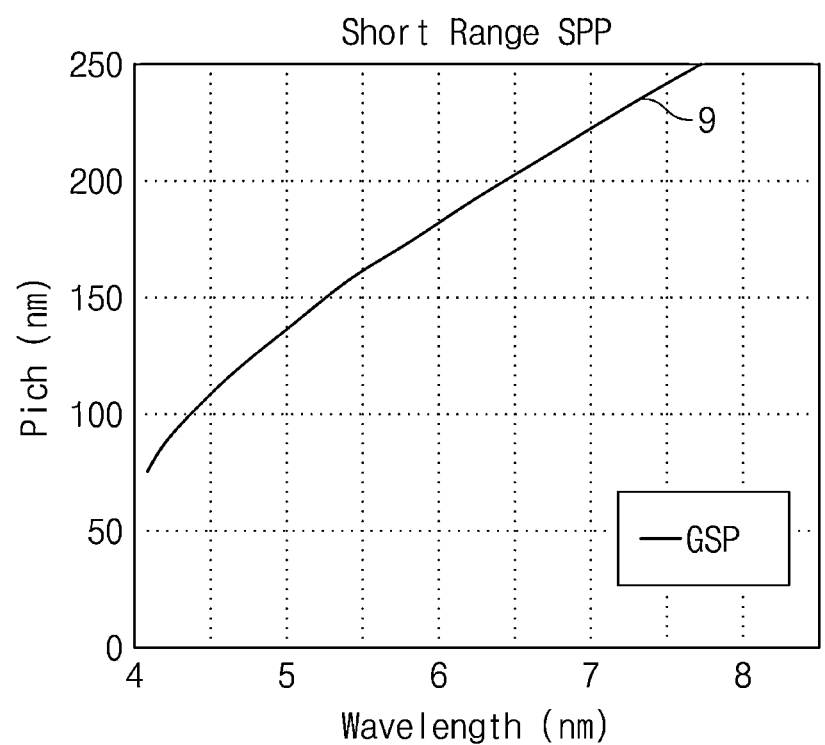
FIG. 9 is a graph showing an example of a first pitch obtained by the gap SPP mode of FIG. 4.

FIG. 9 illustrates an example of a first pitch 9 obtained by the gap SPP mode of FIG. 4.

Referring to FIG. 9, the first pitch 9 may be proportional to a wavelength of light. The first pitch 9 may be calculated by a gap SPP.

Figure 10:
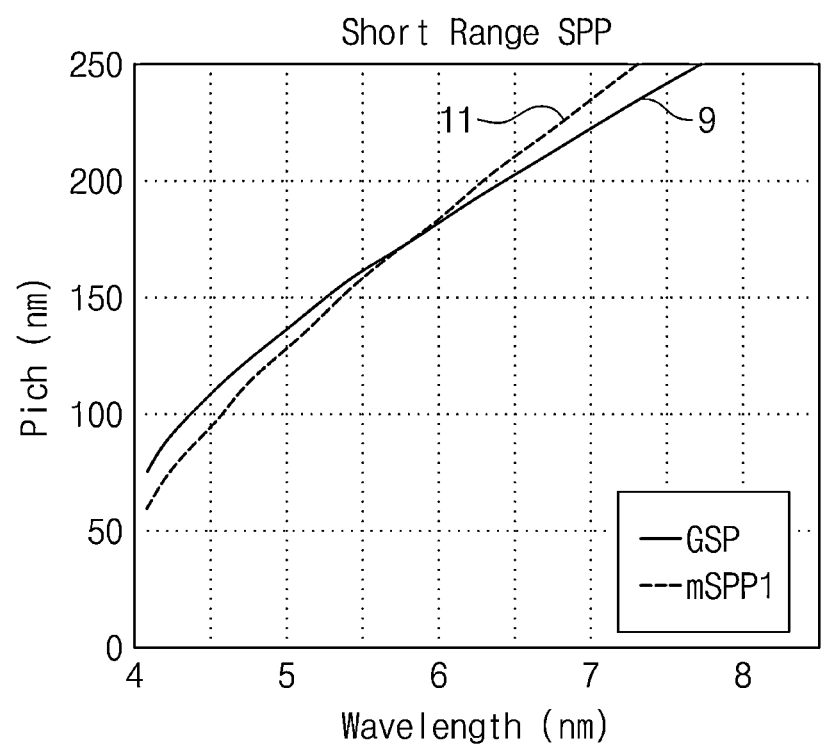
FIG. 10 illustrates graphs showing an example of a second pitch obtained by the mSPP_Al_1 mode and mSPP_air_1 mode of FIGS. 7 and 8.

FIG. 10 illustrates an example of a second pitch 11 obtained by the mSPP_Al_1 mode 4 and mSPP_air_1 mode 7 of FIGS. 7 and 8.

Referring to FIG. 10, the second pitch 11 may be similar to the first pitch 9. The second pitch 11 may be calculated by the mSPP_Al_1 mode 4. There may be a wavelength at which the second pitch 11 and the first pitch 9 match. The wavelength at which the second pitch 11 and the first pitch 9 match may increase complex reflection area efficiency.

Figure 11:
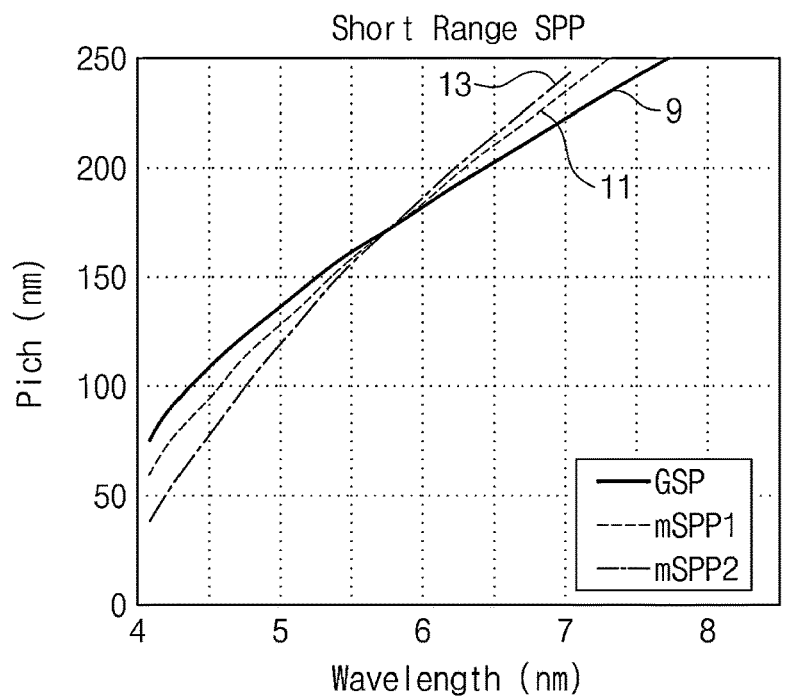
FIG. 11 illustrates graphs showing an example of a third pitch obtained by the mSPP_Al_2 mode and mSPP_air_2 mode of FIGS. 7 and 8.

FIG. 11 illustrates an example of a third pitch 13 obtained by the mSPP_Al_2 mode 5 and mSPP_air_2 mode 8 of FIGS. 7 and 8.

Referring to FIG. 11, the third pitch 13 may intersect the first pitch 9 and the second pitch 11. The first pitch 9, the second pitch 11, and the third pitch 13 may match at one wavelength. The wavelength at which the first pitch 9, the second pitch 11, and the third pitch 13 match may be determined by adjusting the pitch of the antenna electrodes 120 and the thickness of the middle metal oxide layer 60.

Table 1 shows structure conditions in which complex reflection area efficiency is good at RGB wavelengths.

nm to about 340 nm and a width w of about 51 nm to about 96 nm. Hereinafter, thickness conditions for each layer of the meta-structure 100 of the inventive concept and maximum reflection area efficiency of light will be described.

First, when the antenna electrodes 120 have a thickness of about 50 nm, a pitch of about 340 nm, and a width of about 96 nm, the upper insulating layer 110 has a thickness of about 10 nm, the upper metal oxide layer 80 has a thickness of about 7 nm, the upper metal layer 70 has a thickness of about 5 nm, the middle metal oxide layer 60 has a thickness of about 10.5 nm, the lower metal layer 50 has a thickness of about 5 nm, the lower metal oxide layer 30 has a thickness of about 7 nm, the lower insulating layer 20 has a thickness of about 10 nm, and the lower electrode 10 has a thickness of about 100 nm, the meta-structure 100 may have maximum reflection area efficiency for light of a wavelength of about 660 nm.

When the antenna electrodes 120 have a thickness of about 50 nm, a pitch of about 340 nm, and a width of about 96 nm, the upper insulating layer 110 has a thickness of about 10 nm, the upper metal layer 70 has a thickness of about 5 nm, the middle metal oxide layer 60 has a thickness of about 10.5 nm, the lower metal layer 50 has a thickness of about 5 nm, the lower metal oxide layer 30 has a thickness of about 7 nm, the lower insulating layer 20 has a thickness of about 10 nm, and the lower electrode 10 has a thickness of about 100 nm, the meta-structure 100 may have maximum reflection area efficiency for light of a wavelength of about 660 nm.

TABLE 1

| | Condition (thickness (nm)) | | | | | | | | | | |
|---|---|---|---|---|---|---|---|---|---|---|---|
| Antenna electrodes | Upper insulating layer | Upper metal oxide layer | Upper metal layer | Middle metal oxide layer | Lower metal layer | Lower metal oxide layer | Lower insulating layer | Lower electrode | Wavelength wvl | Pitch pitch | Width width |
| 50.0 | 10 | 7 | 5 | 10.5 | 5 | 7 | 10 | 100 | 660 | 340 | 96.0 |
| 50.0 | 10 | 6 | 5 | 10.5 | 5 | 6 | 10 | 100 | 660 | 325 | 91.8 |
| 50.0 | 10 | 8 | 5 | 6.6 | 5 | 8 | 10 | 100 | 660 | 220 | 93.2 |
| 50.0 | 10 | 4 | 5 | 7.7 | 5 | 4 | 10 | 100 | 652 | 305 | 86 |
| 50.0 | 9 | 5 | 5 | 9.3 | 5 | 5 | 9 | 100 | 650 | 200 | 84.7 |
| 50.0 | 10 | 10 | 5 | 6.3 | 5 | 10 | 10 | 100 | 650 | 340 | 96.0 |
| 50.0 | 10 | 5 | 6 | 9 | 6 | 5 | 10 | 100 | 540 | 240 | 67.8 |
| 50.0 | 10 | 5 | 5.5 | 4 | 5.5 | 5 | 10 | 100 | 535 | 158 | 66.9 |
| 50.0 | 10 | 5 | 5.5 | 5.2 | 5.5 | 5 | 10 | 100 | 535 | 235 | 66.4 |
| 50.0 | 10 | 5 | 5.5 | 4 | 5.5 | 5 | 10 | 100 | 525 | 230 | 65.0 |
| 50.0 | 10 | 4 | 5 | 15 | 5 | 4 | 10 | 100 | 475 | 122 | 51 |
| 50.0 | 10 | 7 | 5 | 13.2 | 5 | 7 | 10 | 100 | 473 | 200 | 56.5 |
| 50.0 | 10 | 10 | 5 | 10 | 5 | 10 | 10 | 100 | 470 | 205 | 57.9 |
| 50.0 | 10 | 6 | 5 | 12 | 5 | 6 | 10 | 100 | 470 | 190 | 53.7 |
| 50.0 | 10 | 8 | 5 | 11 | 5 | 8 | 10 | 100 | 470 | 135 | 57.2 |

Referring to Table 1, the antenna electrodes 120 may have a thickness of about 50 nm. The upper insulating layer 110 may have a thickness of about 9 nm to about 10 nm. The upper metal oxide layer 80 may have a thickness of about 4 nm to about 10 nm. The upper metal layer 70 may have a thickness of about 5 nm to about 6 nm. The middle metal oxide layer 60 may have a thickness of about 4 nm to about 15 nm. The lower metal layer 50 may have a thickness of about 5 nm to about 6 nm. The lower metal oxide layer 30 may have a thickness of about 4 nm to about 10 nm. The lower insulating layer 20 may have a thickness of about 9 nm to about 10 nm. The lower electrode 10 may have a thickness of about 100 nm. The light may include visible light having a wavelength of about 470 nm to about 660 nm. The antenna electrodes 120 may have a pitch of about 122

When the antenna electrodes 120 have a thickness of about 50 nm, a pitch of about 325 nm, and a width of about 91.8 nm, the upper insulating layer 110 has a thickness of about 10 nm, the upper metal oxide layer 80 has a thickness of about 6 nm, the upper metal layer 70 has a thickness of about 5 nm, the middle metal oxide layer 60 has a thickness of about 10.5 nm, the lower metal layer 50 has a thickness of about 5 nm, the lower metal oxide layer 30 has a thickness of about 6 nm, the lower insulating layer 20 has a thickness of about 10 nm, and the lower electrode 10 has a thickness of about 100 nm, the meta-structure 100 may have maximum reflection area efficiency for light of a wavelength of about 660 nm.

When the antenna electrodes 120 have a thickness of about 50 nm, a pitch of about 220 nm, and a width of about 93.2 nm, the upper insulating layer 110 has a thickness of about 10 nm, the upper metal oxide layer 80 has a thickness of about 8 nm, the upper metal layer 70 has a thickness of about 5 nm, the middle metal oxide layer 60 has a thickness of about 6.6 nm, the lower metal layer 50 has a thickness of about 5 nm, the lower metal oxide layer 30 has a thickness of about 8 nm, the lower insulating layer 20 has a thickness of about 10 nm, and the lower electrode 10 has a thickness of about 100 nm, the meta-structure 100 may have maximum reflection area efficiency for light of a wavelength of about 660 nm.

When the antenna electrodes 120 have a thickness of about 50 nm, a pitch of about 30.5 nm, and a width of about 86 nm, the upper insulating layer 110 has a thickness of about 10 nm, the upper metal oxide layer 80 has a thickness of about 4 nm, the upper metal layer 70 has a thickness of about 5 nm, the middle metal oxide layer 60 has a thickness of about 7.7 nm, the lower metal layer 50 has a thickness of about 5 nm, the lower metal oxide layer 30 has a thickness of about 4 nm, the lower insulating layer 20 has a thickness of about 10 nm, and the lower electrode 10 has a thickness of about 100 nm, the meta-structure 100 may have maximum reflection area efficiency for light of a wavelength of about 652 nm.

When the antenna electrodes 120 have a thickness of about 50 nm, a pitch of about 20 nm, and a width of about 84.7 nm, the upper insulating layer 110 has a thickness of about 9 nm, the upper metal oxide layer 80 has a thickness of about 5 nm, the upper metal layer 70 has a thickness of about 5 nm, the middle metal oxide layer 60 has a thickness of about 9.3 nm, the lower metal layer 50 has a thickness of about 5 nm, the lower metal oxide layer 30 has a thickness of about 5 nm, the lower insulating layer 20 has a thickness of about 9 nm, and the lower electrode 10 has a thickness of about 100 nm, the meta-structure 100 may have maximum reflection area efficiency for light of a wavelength of about 650 nm.

When the antenna electrodes 120 have a thickness of about 50 nm, a pitch of about 340 nm, and a width of about 96 nm, the upper insulating layer 110 has a thickness of about 10 nm, the upper metal oxide layer 80 has a thickness of about 10 nm, the upper metal layer 70 has a thickness of about 5 nm, the middle metal oxide layer 60 has a thickness of about 6.3 nm, the lower metal layer 50 has a thickness of about 5 nm, the lower metal oxide layer 30 has a thickness of about 10 nm, the lower insulating layer 20 has a thickness of about 10 nm, and the lower electrode 10 has a thickness of about 100 nm, the meta-structure 100 may have maximum reflection area efficiency for light of a wavelength of about 650 nm.

When the antenna electrodes 120 have a thickness of about 50 nm, a pitch of about 240 nm, and a width of about 67.8 nm, the upper insulating layer 110 has a thickness of about 10 nm, the upper metal oxide layer 80 has a thickness of about 5 nm, the upper metal layer 70 has a thickness of about 6 nm, the middle metal oxide layer 60 has a thickness of about 9 nm, the lower metal layer 50 has a thickness of about 6 nm, the lower metal oxide layer 30 has a thickness of about 5 nm, the lower insulating layer 20 has a thickness of about 10 nm, and the lower electrode 10 has a thickness of about 100 nm, the meta-structure 100 may have maximum reflection area efficiency for light of a wavelength of about 540 nm.

When the antenna electrodes 120 have a thickness of about 50 nm, a pitch of about 158 nm, and a width of about 66.9 nm, the upper insulating layer 110 has a thickness of about 10 nm, the upper metal oxide layer 80 has a thickness of about 5 nm, the upper metal layer 70 has a thickness of about 5.5 nm, the middle metal oxide layer 60 has a thickness of about 4 nm, the lower metal layer 50 has a thickness of about 5.5 nm, the lower metal oxide layer 30 has a thickness of about 5 nm, the lower insulating layer 20 has a thickness of about 10 nm, and the lower electrode 10 has a thickness of about 100 nm, the meta-structure 100 may have maximum reflection area efficiency for light of a wavelength of about 535 nm.

When the antenna electrodes 120 have a thickness of about 50 nm, a pitch of about 235 nm, and a width of about 66.4 nm, the upper insulating layer 110 has a thickness of about 10 nm, the upper metal oxide layer 80 has a thickness of about 5 nm, the upper metal layer 70 has a thickness of about 5.5 nm, the middle metal oxide layer 60 has a thickness of about 5.2 nm, the lower metal layer 50 has a thickness of about 5.5 nm, the lower metal oxide layer 30 has a thickness of about 5 nm, the lower insulating layer 20 has a thickness of about 10 nm, and the lower electrode 10 has a thickness of about 100 nm, the meta-structure 100 may have maximum reflection area efficiency for light of a wavelength of about 535 nm.

When the antenna electrodes 120 have a thickness of about 50 nm, a pitch of about 230 nm, and a width of about 65 nm, the upper insulating layer 110 has a thickness of about 10 nm, the upper metal oxide layer 80 has a thickness of about 5 nm, the upper metal layer 70 has a thickness of about 5.5 nm, the middle metal oxide layer 60 has a thickness of about 4 nm, the lower metal layer 50 has a thickness of about 5.5 nm, the lower metal oxide layer 30 has a thickness of about 5 nm, the lower insulating layer 20 has a thickness of about 10 nm, and the lower electrode 10 has a thickness of about 100 nm, the meta-structure 100 may have maximum reflection area efficiency for light of a wavelength of about 525 nm.

When the antenna electrodes 120 have a thickness of about 50 nm, a pitch of about 122 nm, and a width of about 51 nm, the upper insulating layer 110 has a thickness of about 10 nm, the upper metal oxide layer 80 has a thickness of about 4 nm, the upper metal layer 70 has a thickness of about 5 nm, the middle metal oxide layer 60 has a thickness of about 15 nm, the lower metal layer 50 has a thickness of about 5 nm, the lower metal oxide layer 30 has a thickness of about 4 nm, the lower insulating layer 20 has a thickness of about 10 nm, and the lower electrode 10 has a thickness of about 100 nm, the meta-structure 100 may have maximum reflection area efficiency for light of a wavelength of about 475 nm.

When the antenna electrodes 120 have a thickness of about 50 nm, a pitch of about 200 nm, and a width of about 56.5 nm, the upper insulating layer 110 has a thickness of about 10 nm, the upper metal oxide layer 80 has a thickness of about 7 nm, the upper metal layer 70 has a thickness of about 5 nm, the middle metal oxide layer 60 has a thickness of about 13.2 nm, the lower metal layer 50 has a thickness of about 5 nm, the lower metal oxide layer 30 has a thickness of about 7 nm, the lower insulating layer 20 has a thickness of about 10 nm, and the lower electrode 10 has a thickness of about 100 nm, the meta-structure 100 may have maximum reflection area efficiency for light of a wavelength of about 473 nm.

When the antenna electrodes 120 have a thickness of about 50 nm, a pitch of about 205 nm, and a width of about 57.9 nm, the upper insulating layer 110 has a thickness of about 10 nm, the upper metal oxide layer 80 has a thickness of about 10 nm, the upper metal layer 70 has a thickness of about 5 nm, the middle metal oxide layer 60 has a thickness of about 10 nm, the lower metal layer 50 has a thickness of about 5 nm, the lower metal oxide layer 30 has a thickness of about 10 nm, the lower insulating layer 20 has a thickness of about 10 nm, and the lower electrode 10 has a thickness of about 100 nm, the meta-structure 100 may have maximum reflection area efficiency for light of a wavelength of about 470 nm.

When the antenna electrodes 120 have a thickness of about 50 nm, a pitch of about 190 nm, and a width of about 53.7 nm, the upper insulating layer 110 has a thickness of about 10 nm, the upper metal oxide layer 80 has a thickness of about 6 nm, the upper metal layer 70 has a thickness of about 5 nm, the middle metal oxide layer 60 has a thickness of about 12 nm, the lower metal layer 50 has a thickness of about 5 nm, the lower metal oxide layer 30 has a thickness of about 6 nm, the lower insulating layer 20 has a thickness of about 10 nm, and the lower electrode 10 has a thickness of about 100 nm, the meta-structure 100 may have maximum reflection area efficiency for light of a wavelength of about 470 nm.

When the antenna electrodes 120 have a thickness of about 50 nm, a pitch of about 135 nm, and a width of about 57.2 nm, the upper insulating layer 110 has a thickness of about 10 nm, the upper metal oxide layer 80 has a thickness of about 8 nm, the upper metal layer 70 has a thickness of about 5 nm, the middle metal oxide layer 60 has a thickness of about 11 nm, the lower metal layer 50 has a thickness of about 5 nm, the lower metal oxide layer 30 has a thickness of about 8 nm, the lower insulating layer 20 has a thickness of about 10 nm, and the lower electrode 10 has a thickness of about 100 nm, the meta-structure 100 may have maximum reflection area efficiency for light of a wavelength of about 470 nm.

Figure 12:
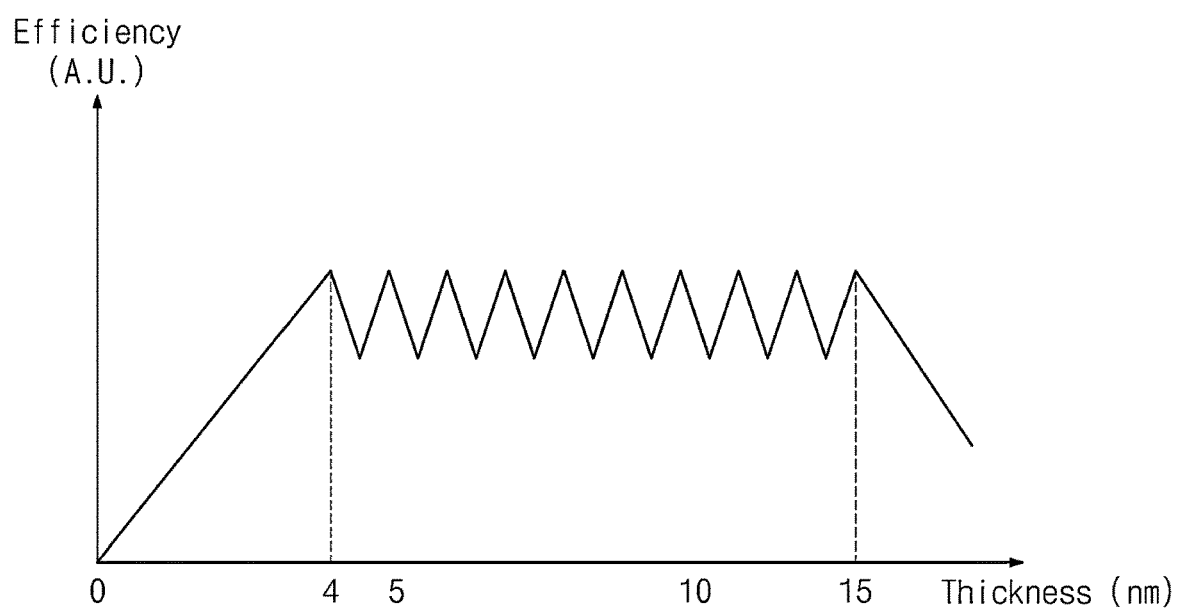
FIG. 12 is a graph showing efficiency according to the thickness of the middle metal oxide layer of FIG. 1.

FIG. 12 illustrates efficiency according to the thickness of the middle metal oxide layer 60 of FIG. 1.

Referring to FIG. 12, complex reflection area efficiency may maximally increase when the thickness of the middle metal oxide layer 60 is about 4 nm to about 13.2 nm.

A method for manufacturing the meta-structure 100 of the inventive concept configured as described above is described below.

FIGS. 13 to 22 are cross-sectional views illustrating a manufacturing process of the meta-structure 100 of the inventive concept.

Figure 13:
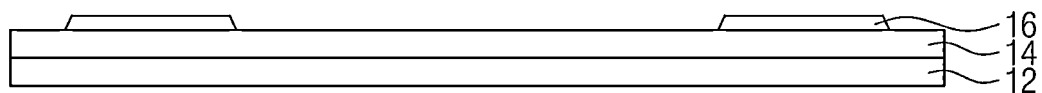
FIG. 13, FIG. 14, FIG. 15, FIG. 16, FIG. 17, FIG. 18, FIG. 19, FIG. 20, FIG. 21 and FIG. 22 are cross-sectional views illustrating a manufacturing process of a meta-structure of inventive concept.

Referring to FIG. 13, a buffer layer 14 and pads 16 are formed on a substrate 12. The substrate 12 may include crystalline silicon. The buffer layer 14 may include silicon oxide formed through plasma enhanced chemical vapor deposition (PECVD). The buffer layer 14 may have a thickness of about 300 nm. The pads 16 may be formed on both edge sides of the substrate 12. The pads 16 may include molybdenum (Mo).

Figure 14:
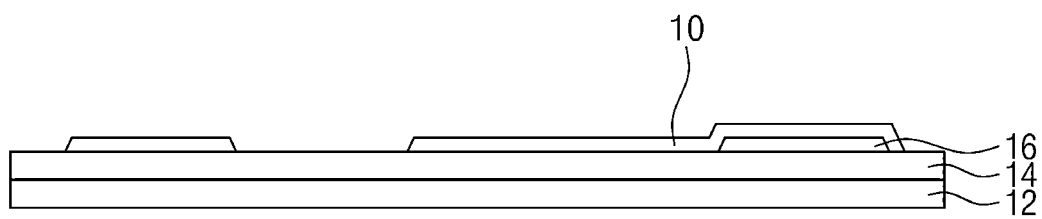

Referring to FIG. 14, the lower electrode 10 is formed on one of the pads 16 and portion of the buffer layer (14). The lower electrode 10 may function and/or operate as a reflective plate.

Figure 15:
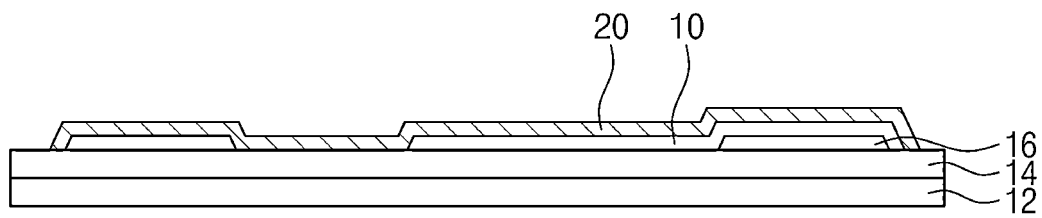

Referring to FIG. 15, the lower insulating layer 20 is formed on the pads 16 and the lower electrode 10. The lower insulating layer 20 may include Al2O3 formed through chemical vapor deposition. The lower insulating layer 20 may have a thickness of about 10 nm or more.

Figure 16:
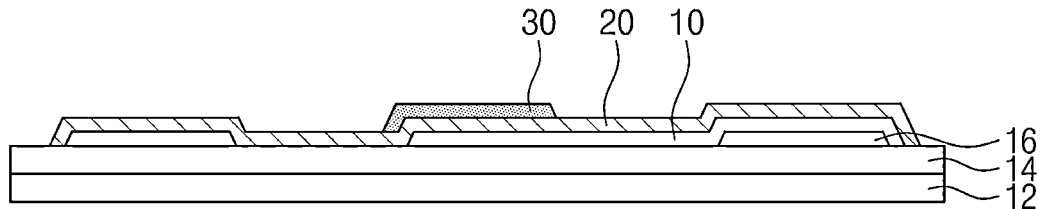

Referring to FIG. 16, the lower metal oxide layer 30 is formed on the lower insulating layer 20 between the pads 16. The lower metal oxide layer 30 may include ITO formed through physical vapor deposition or chemical vapor deposition.

Figure 17:
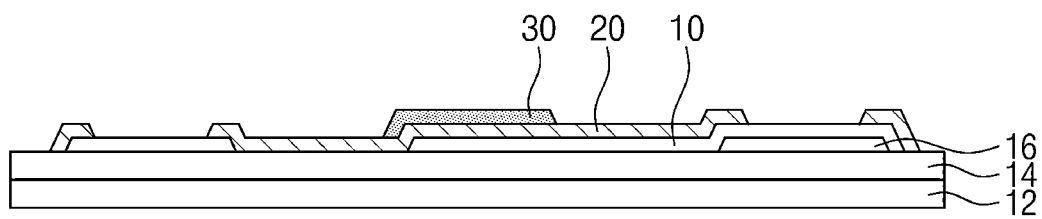

Referring to FIG. 17, the other one of the pads 16 and the lower electrode 10 on one side of the substrate 12 are exposed by removing a portion of the lower insulating layer 20 on an outer perimeter of the lower metal oxide layer 30.

Figure 18:
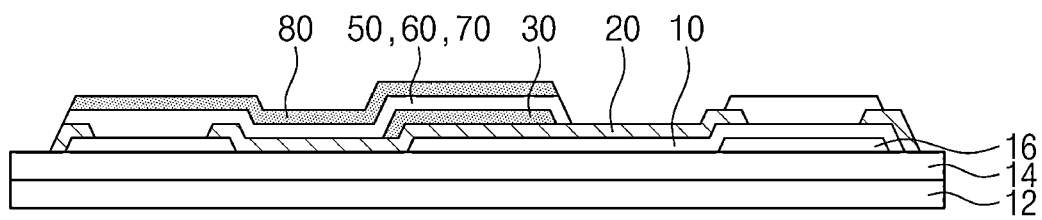

Referring to FIG. 18, the lower metal layer 50, the middle metal oxide layer 60, the upper metal layer 70, and the upper metal oxide layer 80 are formed on the lower metal oxide layer 30, the lower insulating layer 20, and the pads 16. The lower metal layer 50, the middle metal oxide layer 60, the upper metal layer 70, and the upper metal oxide layer 80 may be formed in-situ through physical vapor deposition or chemical vapor deposition. The lower metal layer 50, the middle metal oxide layer 60, the upper metal layer 70, and the upper metal oxide layer 80 each may have a thickness of about 4 nm to about 100 nm.

Figure 19:
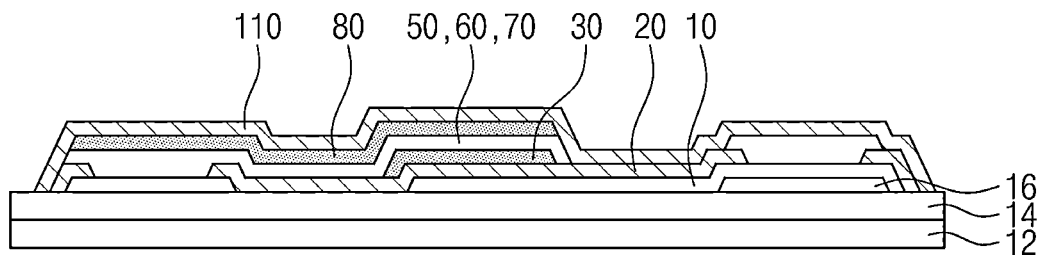

Referring to FIG. 19, the upper insulating layer 110 is formed on the upper metal oxide layer 80 and the lower insulating layer 20.

Figure 20:
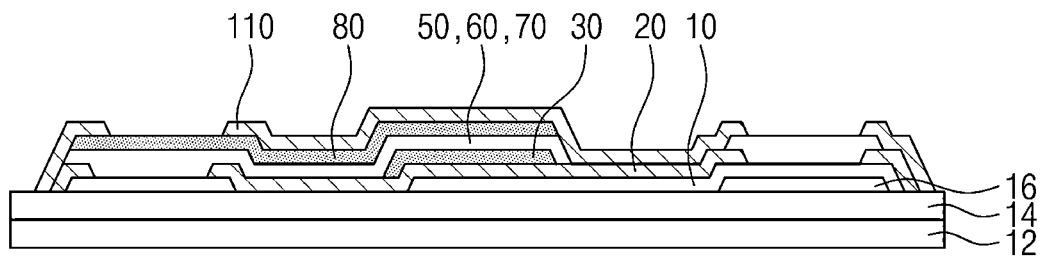

Referring to FIG. 20, one of the pads 16 and a portion of the upper metal oxide layer 80 on the pads 16 are exposed by removing a portion of the upper insulating layer 110.

Figure 21:
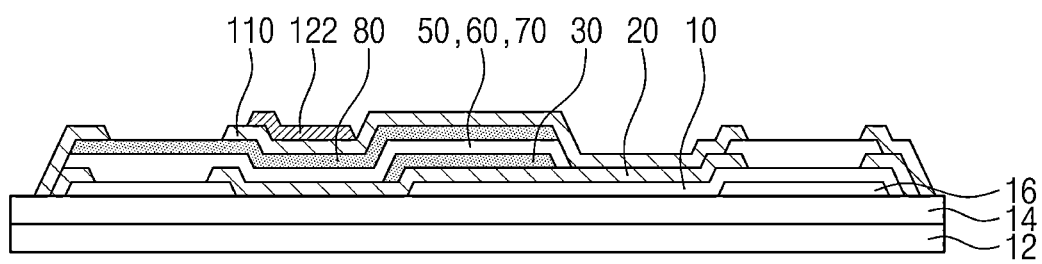

Referring to FIG. 21, a coupler layer 122 is formed on the upper insulating layer 110 so as to be adjacent to the other one of the pads 16. The coupler layer 122 may include molybdenum. The coupler layer 122 may be formed using an e-beam patterning method. For example, the e-beam patterning method may include e-beam coating, e-beam exposure, e-beam development, photoresist coating, partial exposure of outer side of pattern, photoresist strip, and acetone lift-off.

Figure 22:
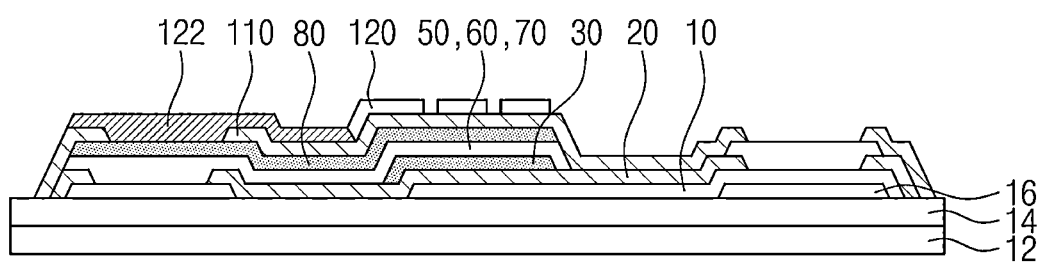

Referring to FIG. 22, the antenna electrodes 120 are formed on the upper insulating layer 110. At least one of the antenna electrodes 120 may be connected to the coupler layer 122.

As described above, a meta-structure according to an embodiment of the inventive concept may increase complex light modulation efficiency using upper, middle, and lower metal oxide layers alternately stacked between upper and lower metal layers.

Although the embodiments of the present invention have been described, it is understood that the present invention should not be limited to these embodiments but various changes and modifications can be made by one ordinary skilled in the art within the spirit and scope of the present invention as hereinafter claimed.

STATEMENT REGARDING PRIOR DISCLOSURES BY THE INVENTOR OR A JOINT INVENTOR

The inventors of the present application have made related disclosure in YONG-HAE KIM et al., "Active metasurface using ITO device in visible wavelength", META 2022 Torremolinos-Spain, The 12th International Conference on Metamaterials, Photonic Crystals and Plasmonics, July 2022. The related disclosure was made less than one year before the effective filing date (Aug. 19, 2022) of the present application and the inventors of the present application are the same as those of the related disclosure. Accordingly, the related disclosure is disqualified as prior art under 35 USC 102(a)(1) against the present application. See 35 USC 102(b)(1)(A).

What is claimed is:

1. A meta-structure comprising:
a lower electrode;
a lower insulating layer on the lower electrode;
a lower metal oxide layer on the lower insulating layer;

a lower metal layer on the lower metal oxide layer;
a middle metal oxide layer on the lower metal layer;
an upper metal layer on the middle metal oxide layer;
an upper metal oxide layer on the upper metal layer;
an upper insulating layer on the upper metal oxide layer; and
antenna electrodes on the upper insulating layer.

2. The meta-structure of claim 1, wherein the middle metal oxide layer has a thickness of 4 nm to 15 nm.

3. The meta-structure of claim 1, wherein each of the lower electrode and the antenna electrodes includes aluminum.

4. The meta-structure of claim 1, wherein each of the lower metal oxide layer, the middle metal oxide layer, and the upper metal oxide layer includes indium tin oxide (ITO).

5. The meta-structure of claim 1, wherein each of the lower metal layer and the upper metal layer includes silver.

6. The meta-structure of claim 1, wherein the antenna electrodes have a thickness of 50 nm, a pitch of 340 nm, and a width of 96 nm, the upper insulating layer has a thickness of 10 nm, the upper metal oxide layer has a thickness of 7 nm, the upper metal layer has a thickness of 5 nm, the middle metal oxide layer has a thickness of 10.5 nm, the lower metal layer has a thickness of 5 nm, the lower metal oxide layer has a thickness of 7 nm, the lower insulating layer has a thickness of 10 nm, and the lower electrode has a thickness of 100 nm.

7. The meta-structure of claim 1, wherein the antenna electrodes have a thickness of 50 nm, a pitch of 325 nm, and a width of 91.8 nm, the upper insulating layer has a thickness of 10 nm, the upper metal oxide layer has a thickness of 6 nm, the upper metal layer has a thickness of 5 nm, the middle metal oxide layer has a thickness of 10.5 nm, the lower metal layer has a thickness of 5 nm, the lower metal oxide layer has a thickness of 6 nm, the lower insulating layer has a thickness of 10 nm, and the lower electrode has a thickness of 100 nm.

8. The meta-structure of claim 1, wherein the antenna electrodes have a thickness of 50 nm, a pitch of 220 nm, and a width of 93.2 nm, the upper insulating layer has a thickness of 10 nm, the upper metal oxide layer has a thickness of 8 nm, the upper metal layer has a thickness of 5 nm, the middle metal oxide layer has a thickness of 6.6 nm, the lower metal layer has a thickness of 5 nm, the lower metal oxide layer has a thickness of 8 nm, the lower insulating layer has a thickness of 10 nm, and the lower electrode has a thickness of 100 nm.

9. The meta-structure of claim 1, wherein the antenna electrodes have a thickness of 50 nm, a pitch of 30.5 nm, and a width of 86 nm, the upper insulating layer has a thickness of 10 nm, the upper metal oxide layer has a thickness of 4 nm, the upper metal layer has a thickness of 5 nm, the middle metal oxide layer has a thickness of 7.7 nm, the lower metal layer has a thickness of 5 nm, the lower metal oxide layer has a thickness of 4 nm, the lower insulating layer has a thickness of 10 nm, and the lower electrode has a thickness of 100 nm.

10. The meta-structure of claim 1, wherein the antenna electrodes have a thickness of 50 nm, a pitch of 20 nm, and a width of 84.7 nm, the upper insulating layer has a thickness of 9 nm, the upper metal oxide layer has a thickness of 5 nm, the upper metal layer has a thickness of 5 nm, the middle metal oxide layer has a thickness of 9.3 nm, the lower metal layer has a thickness of 5 nm, the lower metal oxide layer has a thickness of 5 nm, the lower insulating layer has a thickness of 9 nm, and the lower electrode has a thickness of 100 nm.

11. The meta-structure of claim 1, wherein the antenna electrodes have a thickness of 50 nm, a pitch of 340 nm, and a width of 96 nm, the upper insulating layer has a thickness of 10 nm, the upper metal oxide layer has a thickness of 10 nm, the upper metal layer has a thickness of 5 nm, the middle metal oxide layer has a thickness of 6.3 nm, the lower metal layer has a thickness of 5 nm, the lower metal oxide layer has a thickness of 10 nm, the lower insulating layer has a thickness of 10 nm, and the lower electrode has a thickness of 100 nm.

12. The meta-structure of claim 1, wherein the antenna electrodes have a thickness of 50 nm, a pitch of 240 nm, and a width of 67.8 nm, the upper insulating layer has a thickness of 10 nm, the upper metal oxide layer has a thickness of 5 nm, the upper metal layer has a thickness of 6 nm, the middle metal oxide layer has a thickness of 9 nm, the lower metal layer has a thickness of 6 nm, the lower metal oxide layer has a thickness of 5 nm, the lower insulating layer has a thickness of 10 nm, and the lower electrode has a thickness of 100 nm.

13. The meta-structure of claim 1, wherein the antenna electrodes have a thickness of 50 nm, a pitch of 158 nm, and a width of 66.9 nm, the upper insulating layer has a thickness of 10 nm, the upper metal oxide layer has a thickness of 5 nm, the upper metal layer has a thickness of 5.5 nm, the middle metal oxide layer has a thickness of 4 nm, the lower metal layer has a thickness of 5.5 nm, the lower metal oxide layer has a thickness of 5 nm, the lower insulating layer has a thickness of 10 nm, and the lower electrode has a thickness of 100 nm.

14. The meta-structure of claim 1, wherein the antenna electrodes have a thickness of 50 nm, a pitch of 235 nm, and a width of 66.4 nm, the upper insulating layer has a thickness of 10 nm, the upper metal oxide layer has a thickness of 5 nm, the upper metal layer has a thickness of 5.5 nm, the middle metal oxide layer has a thickness of 5.2 nm, the lower metal layer has a thickness of 5.5 nm, the lower metal oxide layer has a thickness of 5 nm, the lower insulating layer has a thickness of 10 nm, and the lower electrode has a thickness of 100 nm.

15. The meta-structure of claim 1, wherein the antenna electrodes have a thickness of 50 nm, a pitch of 230 nm, and a width of 65 nm, the upper insulating layer has a thickness of 10 nm, the upper metal oxide layer has a thickness of 5 nm, the upper metal layer has a thickness of 5.5 nm, the middle metal oxide layer has a thickness of 4 nm, the lower metal layer has a thickness of 5.5 nm, the lower metal oxide layer has a thickness of 5 nm, the lower insulating layer has a thickness of 10 nm, and the lower electrode has a thickness of 100 nm.

16. The meta-structure of claim 1, wherein the antenna electrodes have a thickness of 50 nm, a pitch of 122 nm, and a width of 51 nm, the upper insulating layer has a thickness of 10 nm, the upper metal oxide layer has a thickness of 4 nm, the upper metal layer has a thickness of 5 nm, the middle metal oxide layer has a thickness of 15 nm, the lower metal layer has a thickness of 5 nm, the lower metal oxide layer has a thickness of 4 nm, the lower insulating layer has a thickness of 10 nm, and the lower electrode has a thickness of 100 nm.

17. The meta-structure of claim 1, wherein the antenna electrodes have a thickness of 50 nm, a pitch of 200 nm, and a width of 56.5 nm, the upper insulating layer has a thickness of 10 nm, the upper metal oxide layer has a thickness of 7 nm, the upper metal layer has a thickness of 5 nm, the middle metal oxide layer has a thickness of 13.2 nm, the lower metal layer has a thickness of 5 nm, the lower metal oxide layer has a thickness of 7 nm, the lower insulating layer has a thickness of 10 nm, and the lower electrode has a thickness of 100 nm.

18. The meta-structure of claim 1, wherein the antenna electrodes have a thickness of 50 nm, a pitch of 205 nm, and a width of 57.9 nm, the upper insulating layer has a thickness of 10 nm, the upper metal oxide layer has a thickness of 10 nm, the upper metal layer has a thickness of 5 nm, the middle metal oxide layer has a thickness of 10 nm, the lower metal layer has a thickness of 5 nm, the lower metal oxide layer has a thickness of 10 nm, the lower insulating layer has a thickness of 10 nm, and the lower electrode has a thickness of 100 nm.

19. The meta-structure of claim 1, wherein the antenna electrodes have a thickness of 50 nm, a pitch of 190 nm, and a width of 53.7 nm, the upper insulating layer has a thickness of 10 nm, the upper metal oxide layer has a thickness of 6 nm, the upper metal layer has a thickness of 5 nm, the middle metal oxide layer has a thickness of 12 nm, the lower metal layer has a thickness of 5 nm, the lower metal oxide layer has a thickness of 6 nm, the lower insulating layer has a thickness of 10 nm, and the lower electrode has a thickness of 100 nm.

20. The meta-structure of claim 1, wherein the antenna electrodes have a thickness of 50 nm, a pitch of 135 nm, and a width of 57.2 nm, the upper insulating layer has a thickness of 10 nm, the upper metal oxide layer has a thickness of 8 nm, the upper metal layer has a thickness of 5 nm, the middle metal oxide layer has a thickness of 11 nm, the lower metal layer has a thickness of 5 nm, the lower metal oxide layer has a thickness of 8 nm, the lower insulating layer has a thickness of 10 nm, and the lower electrode has a thickness of 100 nm.

* * * * *